Nov. 4, 1969    H. R. KINCAID    3,475,969
ARBOR HEAD TOOLING FOR CONNECTING WORKPIECES TO DRIVES
Filed Nov. 9, 1967
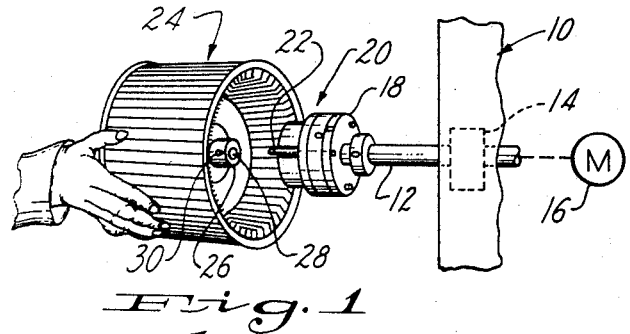
Fig. 1
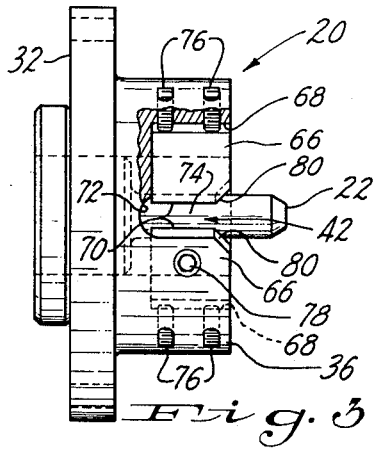
Fig. 3
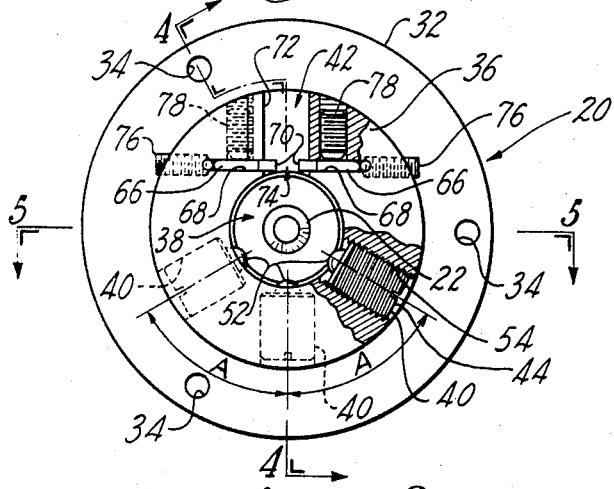
Fig. 2
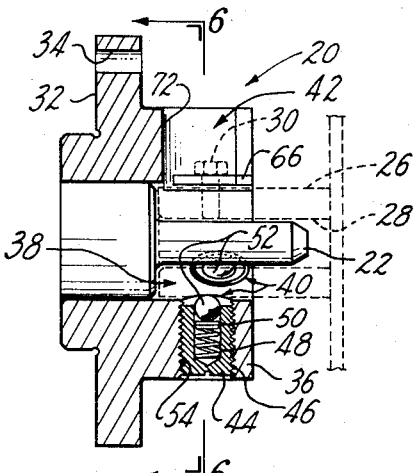
Fig. 4
Fig. 5
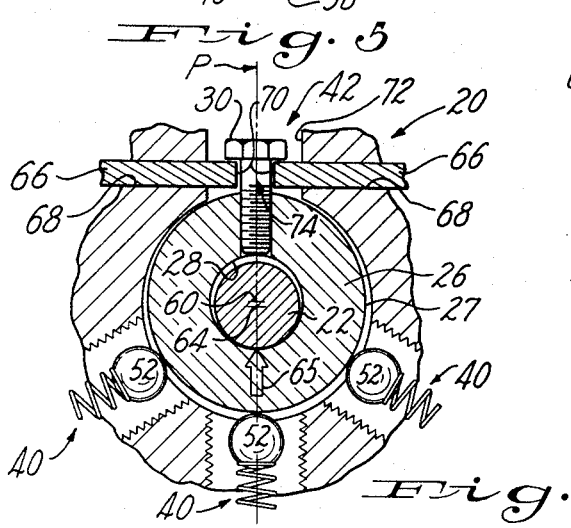
Fig. 6
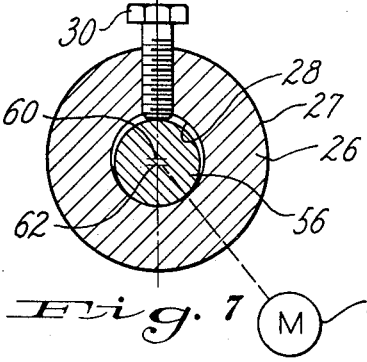
Fig. 7
INVENTOR.
HARRY R. KINCAID
BY
George E. Manias
AGENT

United States Patent Office 3,475,969
Patented Nov. 4, 1969

3,475,969
ARBOR HEAD TOOLING FOR CONNECTING
WORKPIECES TO DRIVES
Harry R. Kincaid, Johnstown, Ohio, assignor to International Research and Development Corporation, Worthington, Ohio, a corporation of Ohio
Filed Nov. 9, 1967, Ser. No. 681,695
Int. Cl. G01m 1/38
U.S. Cl. 73—487
9 Claims

ABSTRACT OF THE DISCLOSURE

Arbor head tooling to which fans having hubs may be quickly connected and disconnected to achieve rapid balancing of the fans. The arbor head tooling includes an adapter element with a spindle or arbor member receivable in a central bore of the fan hub and a collar surrounding the fan hub. Slot means provided in the collar receives the set screw of the fan hub to connect the arbor head tooling in torque transmitting relation with the fan. Spring loaded ball plungers penetrate into the bore of the collar and urge the fan hub against the spindle thereby to place the fan hub in that position relative to its rotational axis which the fan hub would be expected to assume in its normal operating environment.

BACKGROUND OF THE INVENTION

Field of the invention

This invention relates to arbor head tooling and more particularly to arbor head tooling of the type permitting rapid connection and disconnection of fans with suitable drive means for rapid balancing of said fans.

Description of the prior art

Fans of the propeller-type and of the centrifugal-type usually are provided with a central hub having a central bore. In its normal operating environment, the hub is received on the drive shaft of a drive motor. A set screw threadedly engaged in the hub rigidly secures the hub to the drive shaft for rotation therewith.

Fans of the type described can be balanced by current balancing techniques in a relatively short period of time. The steps involved in balancing fans of this type include: mounting the fan on a balancing spindle; tightening the set screw; rotating the fan at its normal operating speed and observing the unbalanced characteristics thereof to determine the required corrective weight and the position at which the corrective weight is to be added to the fan; stopping the fan; adding the corrective weight; loosening the set screw and removing the fan from the balancing spindle.

In mounting the fan on the balancing spindle, tightening the set screw accomplishes two important purposes, one of which is to secure the fan to the spindle so that the fan can be rotated by the spindle. Tightening of the set screw also places the fan in that position relative to its rotational axis which the fan would be expected to assume in its normal operating environment. The time required to tighten and loosen the set screw is significant when compared to the relatively short total time required to balance fans by current balancing techniques. Thus, eliminating the necessity for tightening and loosening the set screw while retaining the two purposes accomplished thereby would be an important advance.

SUMMARY OF THE INVENTION

The principal object of the present invention is to provide an arbor head tooling which permits a fan to be quickly connected to and disconnected from balancing apparatus to achieve more rapid balancing of fans.

Another object of the present invention is to provide means by which a fan may be quickly connected to and disconnected from balancing apparatus without the necessity of tightening and loosening the set screw carried by said fan.

A further object of the present invention is to provide fan support means for balancing purposes wherein the fan is placed in that position relative to its rotational axis which the fan would be expected to assume in its normal operating environment.

The present invention provides arbor head tooling for use with apparatus having drive means for rotating a workpiece, such as a fan having a central fan hub provided with a central bore, at its normal operating speed so that its imbalance characteristics may be determined by extrinsic electronic devices. The present arbor head tooling is driven by the aforesaid drive means and comprises means to which workpieces can be quickly and easily mounted and removed to achieve more rapid balancing of said workpieces.

In accordance with the present invention, the arbor head tooling comprises a mounting flange carrying a spindle or arbor member, and a collar surrounding the arbor member and cooperating therewith to define an annular cavity. The arbor member is received in the central bore of a fan hub and the hub, in turn, is received in the annular cavity.

Connecting means is provided for connecting the arbor member in torque transmitting relation with the fan hub. The connecting means may comprise slot means provided in the collar member, which receives fastener means, such as a set screw carried by the fan hub. Urging means is provided for resiliently and forcefully urging the fan hub into a surface engagement with the arbor member thereby to place the fan hub in that position relative to its rotational axis which the fan hub would be expected to assume in its normal operating environment.

The slot means and urging means are positioned relative to one another such that the direction in which the fan hub is urged relative to the arbor member corresponds substantially with that direction in which the fan hub would be expected to be urged by the set screw relative to a drive shaft when the fan is in its normal operating environment.

BRIEF DESCRIPTION OF THE DRAWINGS

FIGURE 1 is a fragmentary perspective view illustrating balancing apparatus incorporating the arbor head tooling of the present invention and a typical fan positioned to be mounted on the present arbor head tooling;

FIGURE 2 is a front view of the present arbor head tooling;

FIGURE 3 is a plan view of the present arbor head tooling;

FIGURE 4 is a cross-sectional view taken along the line 4—4 of FIGURE 2;

FIGURE 5 is a fragmentary cross-sectional view taken along the line 5—5 of FIGURE 2;

FIGURE 6 is a fragmentary cross-sectional view, taken substantially through the line 6—6 of FIGURE 4, illustrating a fan hub mounted in the arbor head tooling of the present invention; and FIGURE 7 is an exaggerated cross-sectional view illustrating a fan hub in its normal operating environment.

DESCRIPTION OF THE PREFERRED EMBODIMENT(S)

Referring now to FIGURE 1, there is illustrated balancing apparatus 10 having ad rive shaft 12 supported in journal means 14 and connected to drive means schematically illustrated at 16. The drive shaft 12 projects outwardly from the apparatus 10 and supports a mounting assembly 18 on the free end thereof. An arbor head tooling 20 of the present inventon is secured to the mounting assembly 18 and has an arbor member or spindle 22 projecting therefrom.

Also illustrated in FIGURE 1 is a fan 24 of the centrifugal type which is provided with a central hub 26 having a central bore 28 and a set screw 30 threadedly engaged in the hub 26 and positioned to penetrate the central bore 28. The fan 24 is shown held in position preparatory to mounting the same on the arbor head tooling 20.

Referring now to FIGURES 2–6, inclusive, the arbor head tooling 20 comprises, in general, a mounting flange 32 provided with fastener receiving clearance openings 34, a collar member 36 which cooperates with the arbor member 22 to define an annular cavity 38, urging means 40 carried by the collar member 36 for resiliently and forcefully urging the fan hub into a surface engagement with the arbor member 22 thereby to place the fan hub in that position relative to its rotational axis which the fan hub would be expected to assume in its normal operating environment, and connecting means 42 carried by the collar member 36 for connecting the arbor head tooling 20 in torque transmitting realtion with a fan hub.

Referring now in particular to FIGURE 4, the urging means 40 may comprise a spring loaded ball plunger 44 having an externally threaded body 46 containing a spring 48 acting against a pusher plate 50 which, in turn, acts against a ball 52. The spring loaded ball plunger 44 is a readily available, off-the-shelf item. For example, one embodiment of the arbor head tooling 20 employed spring loaded ball plungers which are sold by the Universal Engineering Company of Frankenmuth, Mich., which are identified by Catalog No. 703413 and have an end pressure range of 7 to 50 lbs.

Each of the spring loaded ball plungers 44 is received in a threaded bore 54 and positioned therein such that a portion of the ball 52 projetcts into the annular cavity 38. As best shown in FIGURE 2, the spring loaded ball plungers 44 are aligned along radii which intersect at a longitudinal axis of the arbor member 22 and are angularly spaced from each other as indicated at A. In one embodiment of the arbor head tooling 20 of the spring loaded ball plungers 44 were spaced at an angle of 60° from each other.

As can best be seen in FIGURE 5, the urging means 40 are likewise spaced along the longitudinal length of the cavity 38 whereby only one ball 52 at a time must be overcome by a fan hub as the fan hub is inserted into the annular cavity 38.

Referring now to FIGURE 7, there is illustrated a fan hub 26 having a cylindrical outer surface 27, received on a drive shaft 56 which is an integral part of motor means 58. The drive shaft 56 and motor means 58 are intended to represent a conventional electric motor employed to rotate the fan hub 26 and, hence, FIGURE 7 is intended to illustrate the fan hub 26 in its normal opearting environment. After the hub 26 is received on the drive shaft 56, the set screw 30 is tightened and the fan hub 26 is rigidly secured to the drive shaft 56. In FIGURE 7, the outer diameter of the drive shaft 56 is shown to be smaller than the inner diameter of the central bore 28. The difference between these two diameters has been purposely exaggerated in order to show that the hub 26 is shifted relative to the drive shaft 56 when the set screw 30 is tightened. For example, the hub 26 has a geometric center 60 which is displaced from a rotational axis 62 of the hub/shaft assembly. Thus, FIGURE 7 illustrates, in an exaggerated manner, that position of the hub 26 relative to its rotational axis 62 which the hub 26 would be expected to assume in its normal operating environment.

Returning now to FIGURE 6, it should be understood that the outer diameter of the arbor member 22 will be substantially equal to the outer diameter of the drive shaft to which the hub 26 is to be mounted. As can be seen, the balls 52 of the urging means 40 displace the hub 26 such that its geometric center 60 is displaced from the rotational axis 64 of the arbor member/hub assembly. The amount by which the geometric center 60 of the hub is displaced from the rotational axis 64 preferably is substantially equal to the amount by which the geometric center 60 is displaced from the rotational axis 62 (FIGURE 7).

It should be noted at this time that the balls 52 of the urging means 40 are frictionally engaged with the cylindrical outer surface of the hub 26 and are in rolling contact therewith. Thus, the urging means 40 are not employed in their conventional manner wherein the balls 52 thereof are received in corresponding depressions formed in the surface to which it is to be engaged. The balls 52 of the urging means 40 are frictionally engaged with the cylindrical outer surface 27 and provide the necessary force for displacing the hub 26 relative to the arbor member 22.

The resultant line of action of the forces applied to the fan hub 26 by the three urging means 40 is schematically represented in FIGURE 6 by the arrow 65. The rotational axis 64 of the arbor member/hub assembly, the arrow 65 and the longitudinal centerline of the intermediate urging means 40 lie in a common plane represented by the dash-dot line P. As will soon become apparent, the connecting means 42 serves to connect the arbor head tooling 20 in torque transmitting relation with a fan hub. The connecting means 42 also serves to position the set screw carried by the hub in diametrically opposed relation with the resultant line of action (arrow 65) of the urging means 40 thereby duplicating substantially the position of the fan hub relative to its rotational axis when the fan is in its normal operating environment and when the set screw is tightened.

Referring now to FIGURES 2, 3 and 6, the connecting means 42 comprises a pair of wear plates 66 slideably retained in opposed slots 68 formed in the collar 36 and positioned so as to present opposed edges 70 projecting into a recess 72 formed in the collar member 36. The opposed edges 70 define a slot 74 whose width may be adjusted by moving the wear plates 66 toward and away from each other. Such movement of the wear plates 66 is facilitated by adjusting screws 76 which are threaded into the collar member 36 and engage the opposite ends of the wear plates 66. The wear plates 66 are clamped in their finally adjusted position by means of clamping screws 78 carried by the collar member 36 and which bear against the wear plate 66. The wear plates 66 are provided with bevelled corners 80 which cooperate to facilitate entry of a set screw into the slot 74.

As can be seen in FIGURE 6, the set screw 30 resides within the slot 74 and is positioned by the opposed edges 70 in direct opposition to the resultant line of action 65 of the urging means 40. In addition, the set screw 30 is captively retained within the slot 74 thereby connecting the arbor head tooling 20 in torque transmitting relation with the hub 20.

It should now be readily apparent that a fan, such as the fan 24 of FIGURE 1, may be rapidly mounted on the arbor head tooling 20 and that when mounted thereon, the fan 24 is connected in torque transmitting relation with the arbor head tooling 20, the set screw 30 is automatically positioned in opposition to the urging means 40 and that the fan hub 26 is urged into a surface engagement with the arbor member 22 thereby placing the fan hub 26 in that position relative to its rotational axis which the fan hub would be expected to assume in its normal operating environment. It should also be readily apparent that the fan 24 may be quickly disconnected from the arbor head tooling 20.

It should be understood that the three urging means 40 may be replaced by a single pneumatically operated plunger which is positioned diametrically opposite to the recess 72.

I claim:

1. In apparatus for determining the imbalance of fans having a central hub provided with a central bore and fastener means projecting outwardly of said central hub, said apparatus including drive means for rotating said fan at angular velocities suitable for determining the imbalance characteristics of said fan, and connector means for detachably connecting said fan to said drive means, the improvement in said connector means comprising:

an arbor member rigidly connected with said drive means and extending into said central bore thereby to support said fan for rotation;

a collar member rigidly secured to said drive means and surrounding said fan hub;

connector means for connecting said collar member in torque transmitting realtion with said fan hub; and urging means carried by one said member for resiliently and forcefully urging said fan hub into a surface engagement with said arbor member which places said fan hub in that position relative to its rotational axis which said fan hub would be expected to assume in its normal operating environment.

2. The improvement defined in claim 1 wherein said means for resiliently and forcefully urging said fan hub into a surface engagement with said arbor is carried by said collar member.

3. The improvement defined in claim 1 wherein said urging means comprises spring loaded balls.

4. The improvement defined in claim 1 wherein said connector means comprises:

slot means in said collar member for captively receiving the said fastener means of said central hub.

5. The improvement defined in claim 4 wherein said slot means is positioned in direct opposition to said urging means.

6. The improvement defined in claim 4 wherein said slot means comprises:

a pair of plate means supported by said collar member for movement toward and away from each other, said plate means having opposed, spaced-apart edges defining a slot generally parallel with said arbor member; and means for clamping said plate means in adjusted position.

7. The improvement defined in claim 1 wherein said urging means comprises:

a plurality of spring loaded plunger assemblies carried by said collar member at angularly spaced positions about said arbor member;

each of said assemblies including a plunger projecting inwardly of the inner surface of said collar member.

8. The improvement defined in claim 7 wherein said spring loaded plunger assemblies are spaced from each other along the longitudinal length of said collar member.

9. The improvement defined in claim 7 wherein each said plunger comprises a ball positioned for rolling contact with said central hub.

References Cited

UNITED STATES PATENTS 3,076,363   2/1963   Hack _____ 73—461 XR

JAMES J. GILL, Primary Examiner